United States Patent [19]

Maeda et al.

[11] 3,880,797

[45] Apr. 29, 1975

[54] PROCESS FOR PREPARING COLORED POLYURETHANE

[75] Inventors: Shigeo Maeda; Minoru Ozutsumi; Isao Niimura; Hideo Okazaki, all of Tokyo, Japan

[73] Assignee: Hodogaya Chemical Co., Ltd., Tokyo, Japan

[22] Filed: Aug. 10, 1973

[21] Appl. No.: 387,504

[52] U.S. Cl......... 260/37 N; 260/75 NH; 260/75 NP; 260/77.5 AM; 260/145 A; 260/147; 260/149; 260/151
[51] Int. Cl............................................. C08g 51/66
[58] Field of Search...... 260/37 N, 37 NP, 77.5 AQ, 260/77.5 AP, 77.5 AM, 75 NH, 75 NP, 75 NQ, 314.5

[56] References Cited
UNITED STATES PATENTS

| | | | |
|---|---|---|---|
| 3,062,831 | 11/1962 | Freyermuth | 260/314.5 |
| 3,261,827 | 7/1966 | Boresch | 260/314.5 |
| 3,278,486 | 10/1966 | Meck | 260/77.5 AP |
| 3,625,937 | 12/1971 | Scholl | 260/37 N |
| 3,730,950 | 5/1973 | Barnes | 260/37 N |

*Primary Examiner*—Joseph L. Schofer
*Assistant Examiner*—Paul R. Michl
*Attorney, Agent, or Firm*—Oblon, Fisher, Spivak, McClelland & Maier

[57] ABSTRACT

A colored polyurethane material is prepared by reacting a polyisocyanate compound and a polyhydroxyl compound with a complex metal dye which contains at least one amino group or a hydroxyl group with one active hydrogen atom whereby the polyurethane material is colored by the presence of the chemically bonded complex metal dye.

6 Claims, No Drawings

PROCESS FOR PREPARING COLORED POLYURETHANE

BACKGROUND OF THE INVENTION

1. Field of the Invention

This invention relates to a process for preparing colored polyurethane material.

2. Description of the Prior Art

In the past colored polyurethane materials have been prepared principally by coloring polyurethanes with a pigment, dye or a coloring agent consisting essentially of a pigment or dye. However, when polyurethane materials are colored with a pigment, the resulting product is only lightly tinted or it may have a dark hue. On the other hand, if a dye is used to color the product, the water-resistance, oil-resistance, resistance to bleeding, light-fastness, or the like of the product is often disadvantageously inadequate. When a dye is used as the coloring agent, it is hard to prevent bleeding of the dye from the colored polyurethane product. However, colored polyurethane products, when colored with a dye, have the advantage of possessing a clear hue and transparency. Of course, polyurethane materials of many different colors can be produced, limited only by the types of dyes available. For these reasons dyes have chiefly been used to color polyurethane materials, even though dyes have the previously described disadvantages.

A need, therefore, exists for a coloring agent which has excellent color fastness, water resistance, oil resistance, bleeding resistance and light fastness.

SUMMARY OF THE INVENTION

Accordingly, one object of this invention is to provide a process for preparing a colored polyurethane material in which a coloring agent is used which has excellent dispersibility, water resistance, oil resistance, light fastness and clear hue while possessing good bleeding resistance.

Briefly, this object and other objects of this invention as hereinafter will become more readily apparent can be attained by a process for preparing a colored polyurethane material which comprises reacting a polyisocyanate compound and a polyhydroxyl compound with a complex metal dye which contains at least one amino group or a hydroxyl group having one active hydrogen atom, whereby the polyurethane material is colored by the presence of the chemically bonded complex metal dye.

DESCRIPTION OF THE PREFERRED EMBODIMENTS

In the process of the invention the coloring agent of the invention colors polyurethane materials by a mechanism which is different from the mechanism by which polyurethane materials are colored with conventional pigments or dyes. The conventionally colored polyurethane materials contain a pigment or a dye which is simply dispersed or solubilized by a mechanical process in the polyurethane. On the other hand, polyurethane materials are colored with the coloring agent of the invention by a mechanism in which a complex metal dye, which has an active hydrogen atom, is reacted with an isocyanato group of a polyisocyanate substrate which is one of the components of a polyurethane. By this mechanism, the complex metal dye is chemically bonded to the polyurethane molecule. As a result, the bleeding resistance and the light fastness of the colored polyurethane product is substantially improved.

The complex metal dye which has at least one amino group or hydroxyl group with an active hydrogen atom, reacts with the isocyanato group of the polyisocyanate substrate, which substrate also reacts with a polyol or the polyurethane base to form a colored polyurethane product containing a bonded complex metal dye. The polyisocyanate substrate has at least two isocyanate groups and reacts with a polyol or a polyurethane to form a higher polyurethane product. Suitable polyisocyanate substrates are disclosed in J. H. Saunders and K. C. Frisch, Polyurethanes: Chemistry and Technology I Chemistry, Part I, pages 9 – 12, pages 347 – 348 (1962).

In the process of the invention it is especially preferable to use a prepolymer which has at least two terminal isocyanate groups such as triisocyanates which are prepared by reacting 1 mole of trimethylol-propane with 3 moles of 2,4-tolylene diisocyanate or hexamethylene diisocyanate, or diisocyanates which are prepared by reacting propyleneglycol adipate with a diisocyanate. Suitable polyhydroxyl compounds which are reacted with the polyisocyanate groups include polyester polyols, polyether polyols or polyurethanes which have active hydrogen atoms which react with the isocyanate groups of the polyisocyanate. Suitable polyols and polyurethanes which react with the polyisocyanate compounds are disclosed in the previously mentioned book, "Polyurethanes," pages 32 – 47 and pages 349 – 351. Polyols having an OH value of 10 – 50 are especially preferred, and can be prepared by reacting a co-ester of ethyleneglycol and diethyleneglycol adipate with tolylene diisocyanate. Other preferred polyols include polytetramethyleneglycol which has an OH value of 80 – 160 or polypropylene glycol which has an OH value of 80 – 160.

The complex metal dye which has at least one amino group or hydroxyl group with an active hydrogen atom include 2 : 1 complex metal dyes, 1 : 1 complex metal dyes, Cu-phthalocyanine dyes, complex metal formazan dyes, and the like. All of these metal dyes contain an alkylamino group, an amino group containing a non-dissociated substituent or an alcoholic hydroxyl group. Suitable 2 : 1 complex metal dyes include those which have an amino group or a hydroxyl group with an active hydrogen atom and which have the following formulas

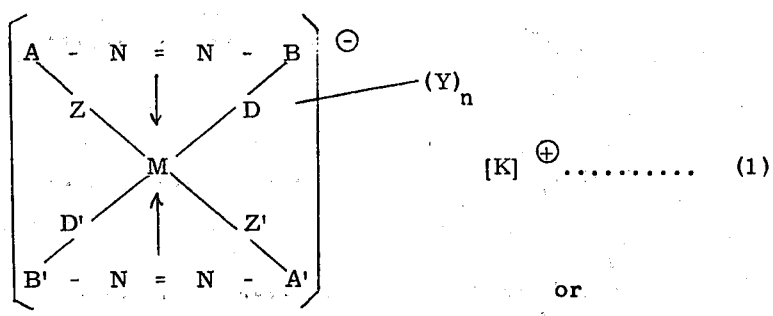

or

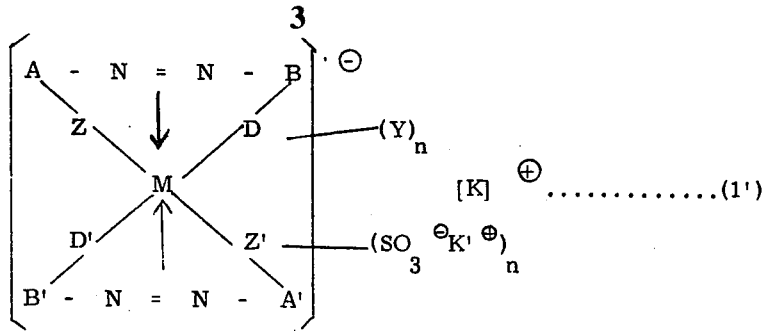

wherein A and A' can be the same or different and each can represent a residual phenylene radical which can have a non-dissociated substituent; B and B' can be the same or different and each represents a residual coupling component which can have a non-dissociated substituent and which have the metal coupling D and D' groups disposed in an ortho relationship to the bridging azo groups; Z and Z' can be the same or different and each represents an —O—, or —COO— group which is disposed in an ortho relationship to the bridging azo groups through groups A and A'; D and D' can be the same or different and each represents —O—, —NH—, or $-\underset{|}{N}$-alkyl;

M represents a chromium or cobalt atom; $[K]^+$ represents hydrogen ion, sodium ion, ammonium, aliphatic and substituted aliphatic ammonium or acyclic ammonium; $K'^+$ represents aliphatic and substituted aliphatic ammonium or acyclic ammonium and $n$ represents an integer from 1 to 6. In formulas (1) and (1') Y represents wherein $R_1$ and $R_2$ represent hydrogen, lower alkyl, amino or hydroxy substituted lower alkyl, N-alkylamino or N-hydroxylalkylamino-substituted lower alkyl groups wherein at least one of the $R_1$ and $R_2$ groups is an active hydrogen atom; and $R_1$ and $R_2$ can be cyclized together to form a hetero six membered ring with the nitrogen containing imino group; $X_3$ represents —$SO_2$—, —$NHSO_2$—, —CO—, or —NHCO—; and $a$ represents an integer from 1 to 4; and Y can bond with A or B or both A and B.

The 2 : 1 complex metal dyes can be prepared by reacting a chromium or cobalt metallizing agent by any conventional process with a monoazo dye having the formula

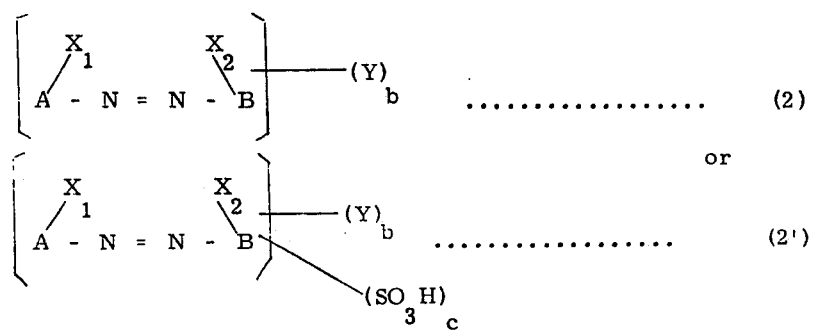

wherein A and B are defined as above; $X_1$ represents a hydroxyl or carboxyl group; $X_2$ represents hydroxyl, amino or lower alkylamino; $b$ is 1 or 2; and $c$ is 1, 2 or 3.

Suitable copper phthalocyanine dyes include those which have the formula

       (3)

       (4)

       (5)

       (6)

       (7)

       (8)

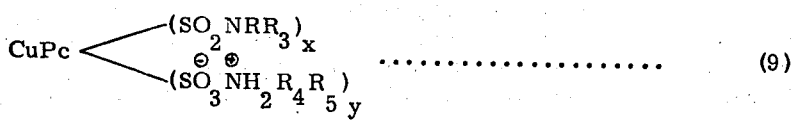   (9)

wherein CuPc represents a chlorinated or nonchlorinated copper phthalocyanine moiety; R represents hydrogen, alkyl, or hydroxyalkyl; $R_3$ represents

   (10)

   (11)

   (12)

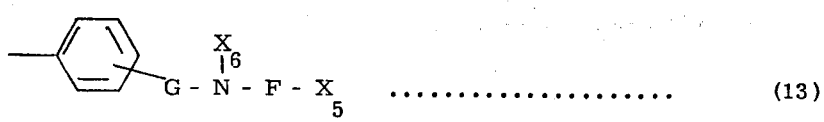   (13)

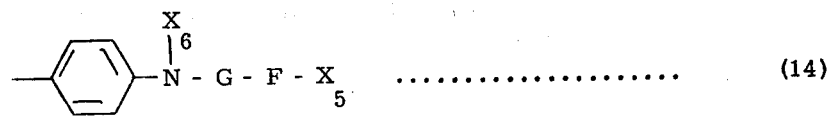   (14)

   (15)

wherein E represents a substituted alkylene group containing at least one $X_4$ group wherein $X_4$ represents hydroxyl, amino, alkylamino or an alkylamino group substituted with a nondissociable group; F represents a substituted alkylene group containing at least one $X_5$ group wherein $X_5$ represents hydroxyl; G represents $-SO_2-$ or $-CO-$; $X_6$ represents hydrogen, alkyl or hydroxyalkyl and $X_7$ represents amino, alkylamino or hydroxyl substituted alkyl amino; $R_4$ represents hydrogen or alkyl; $R_5$ represents alkyl oran alkyl group substituted with a nondissociable group; $x$ represents an integer from 1 to 4; $y$ represents 0 or an integer from 1 to 3 and $x + y$ is 1, 2, 3 or 4.

The 2 : 1 complex metal dyes as well as the copper phthalocyanine dyes are disclosed in the copending applications Ser. Nos. 376,365 and 376,387.

In the preparation of the colored polyurethane materials the complex metal dye which contains an amino group or a hydroxyl group is usually first dissolved in an inert solvent such as dimethylformamide, methylethylketone, toluene, ethylacetate, acetone, tetrahydrofuran, or the like. However, a solvent mixture of tetrahydrofuran and dimethylformamide is especially preferred. The complex metal dye can then be reacted with a prepolymer prepared by reacting an excess quantity of a polyisocyanate with a hydroxyl compound such as a polyol. For example, one typical prepolymer is prepared by reacting 2,4-tolylenediisocyanate with a polyester polyol which in turn is prepared by reacting adipic acid with propyleneglycol. The colored polyurethane materials can be prepared in a solution, as an emulsion, as an aqueous dispersion, as an elastomer, or the like depending upon the selection of the starting materials which include the solvent, the polyisocyanate, the polyol, and the polyurethane.

The following descriptions are brief discussions of various forms of colored polyurethane materials.

I. Preparation of a colored polyurethane solution (dope)

1. A complex metal dye which contains an active hydrogen atom is reacted with a polyisocyanate and a polyhydroxyl compound in an inert solvent which does not react with the isocyanate group.

2. A prepolymer which contains an isocyanate group is prepared by reacting a polyhydroxyl compound with a polyisocyanate compound, and then the prepolymer is chain-extended with a complex metal dye which contains an active hydrogen atom in an inert solvent.

3. A prepolymer is prepared by reacting a polyisocyanate in an inert solvent with a complex metal dye which contains an active hydrogen atom and a polyol, and then the colored prepolymer is chain-extended by reacting it with a compound which contains two active hydrogen atoms such as hydrazine, hydroxylamine, polyoxyethylene polyol, polyester polyol, water, or the like.

II. Preparation of a colored polyurethane aqueous dispersion

1. A prepolymer is prepared by reacting a polyisocyanate with a complex metal dye which contains an active hydrogen atom and a polyhydroxyl compound, which at the same time reacts with a compound which contains an active hydrogen atom and a compound containing a salt forming group. The resulting polyurethane product is converted to the salt form, if necessary, and then is dispersed in water.

2. A prepolymer is prepared by reacting a polyisocyanate with a complex metal dye which contains an active hydrogen atom and a polyhydroxyl compound in an inert solvent. The polyurethane solution is then admixed with a surfactant, preferably a nonionic surfactant, and water and then homogenized to form an aqueous dispersion of the polyurethane.

III. Preparation of a colored polyurethane elastomer

A linear difunctional hydroxylpolymer, a polyisocyanate, a complex metal dye which contains an active hydrogen atom and a diester diol or glycol chain extender are admixed and heated to initiate the reaction.

It is within the scope of this invention that any process suitable for preparing polyurethane materials can be modified by adding a complex metal dye which contains an active hydrogen atom to the polyurethane reaction solution during the polymerization reaction while unreacted isocyanate groups remain. The following reaction sequences show some of the different means by which colored polyurethane products can be prepared.

I. Complex metal dye is bonded to a polyurethane substrate by urea bonds

1. A complex metal dye with one active hydrogen atom

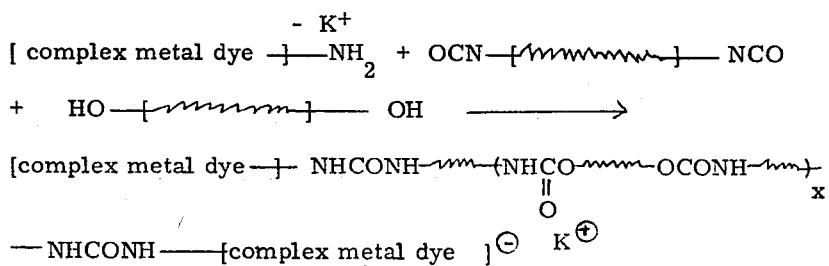

2. A complex metal dye with two active hydrogen atoms

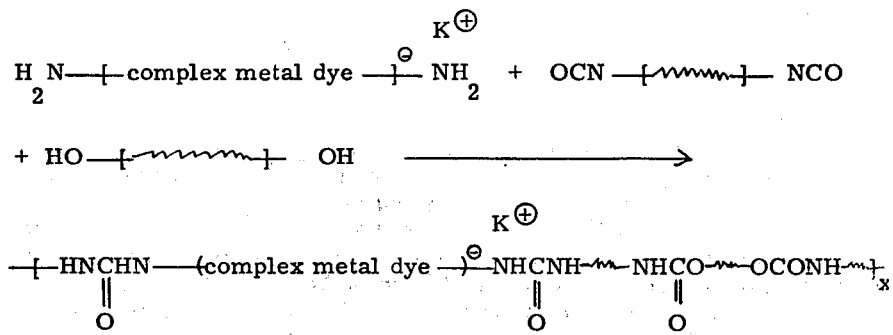

3. A complex metal dye with three active hydrogen atoms

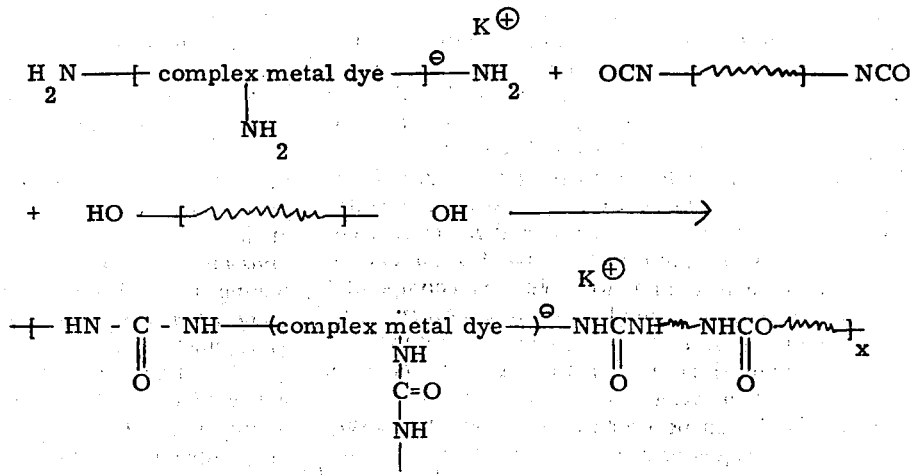

II. A complex metal dye is bonded to a polyurethane substrate by urethane bonds
1. A complex metal dye with one active hydrogen atom
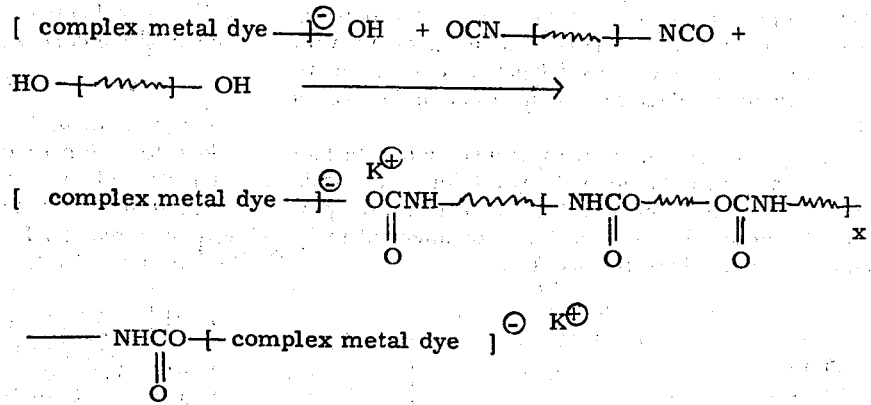
2. A complex metal dye with two active hydrogen atoms
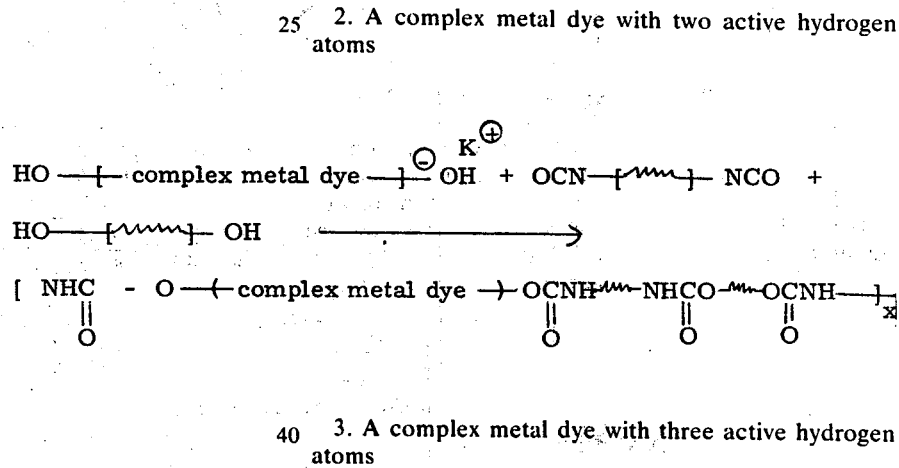
3. A complex metal dye with three active hydrogen atoms
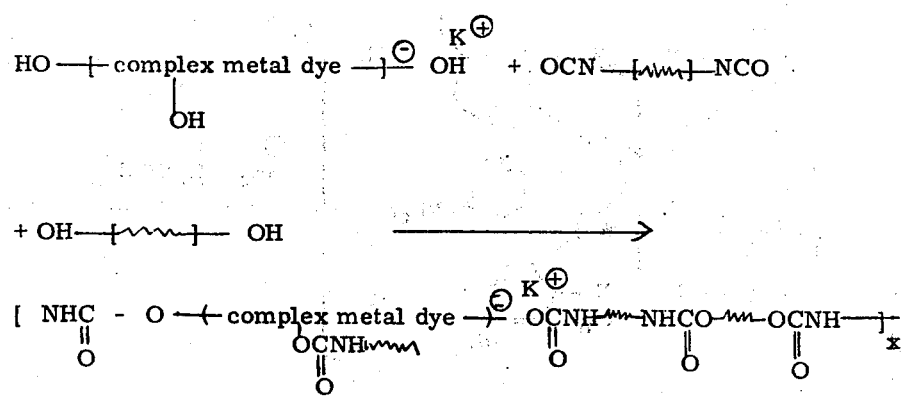

In the formulas of the equations, $K^+$ represents hydrogen ion, alkali metal ions, ammonium ions, aliphatic ammonium ions, or acyclic ammonium ions; and $x$ represents an integer.

The colored polyurethane products of this invention have many applications, because of their chemical and physical properties. For example, the colored polyurethane products can be used in coating agents for various substrates, paints, inks, lacquers, bonding agents, water repelling agents, wire coatings and in the soles of shoes.

Having generally described this invention, a further understanding can be obtained by reference to certain specific examples which are provided herein for purposes of illustration only and are not intended to be limiting unless otherwise specified.

polypropyleneglycol (OH value 112.2) was used instead of the polyol prepared above, a similar colored polyurethane dope was obtained. Further, when urethane triisocyanate prepared by reacting 3 moles of tolylenediisocyanate or hexamethylene diisocyanate with 1 mole of trimethylol propane was used instead of 4,4'-diphenylmethane diisocyanate, a similar colored polyurethane dope was obtained.

EXAMPLE 2

4.6 Parts of 4,4'-diphenylmethanediisocyanate was added to 11.6 parts of polytetramethyleneglycol (OH value 95) at 80°C with stirring, and the mixture was reacted at 96° – 97°C for 2 hours whereby a prepolymer was prepared. 50 Parts of tetrahydrofuran was then added to dissolve the prepolymer.

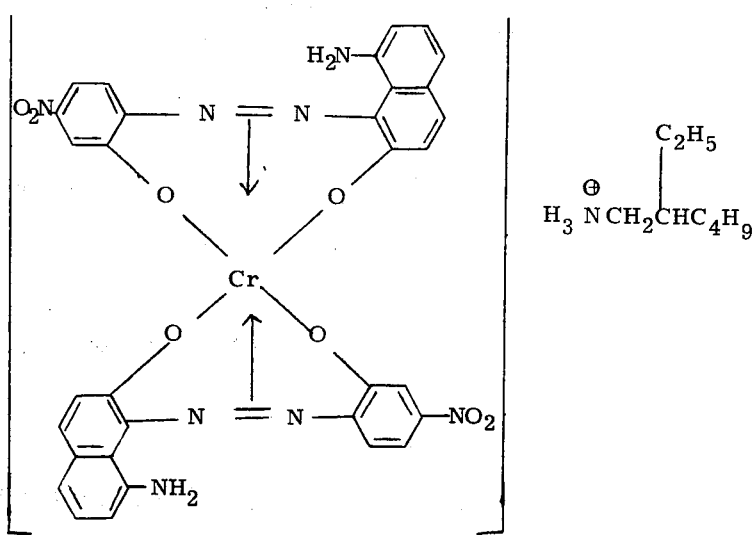

EXAMPLE 1

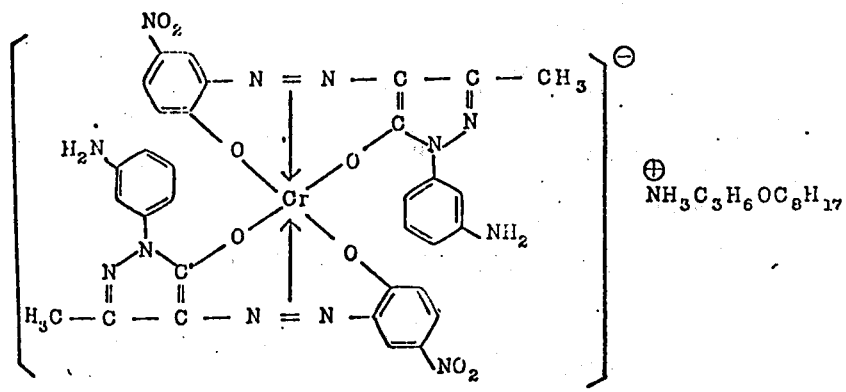

0.5 Part of a 2 : 1 complex chromium dye of the above formula which contains two amino groups was dissolved in 40 parts of tetrahydrofuran. A solution of 2.3 parts of 4,4'-diphenylmethane diisocyanate in 10 parts of tetrahydrofuran and 20 parts of a polyol which is prepared by reacting tolylene diisocyanate with the adipic acid coester of ethyleneglycol and diethyleneglycol (OH value 30) was added to the dye solution and the mixture was stirred at 50°C for 4 hours. A colored polyurethane dope was thereby obtained.

When polytetramethyleneglycol (OH value 86.3) or 4.0 Parts of the 2 : 1 complex chromiun dye with the formula above which contains amino groups were dissolved in 80 parts of tetrahydrofuran, and the solution was admixed with the stirred prepolymer solution prepared above at 62° – 63°C whereby the components were reacted for 2 hours. By this procedure was obtained a black polyurethane dope.

When polypropylene glycol (OH value 112.2) was used instead of polytetramethyleneglycol, a similar colored polyurethane dope was obtained. Further, when urethane triisocyanate prepared by reacting 3 moles of 2,4-tolylenediisocyanate or hexamethylenediisocyanate with 1 mole of trimethylol propane was used instead of 4,4'-diphenylmethanediisocyanate, a similar colored polyurethane dope was obtained.

EXAMPLE 3

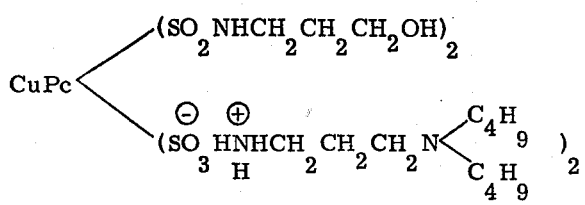

5.2 Parts of the Cu-phthalocyanine dye with the formula above were added to 100 parts of vigorously stirred polypropyleneglycol (OH value 84) and then 27.2 parts of 4,4'-diphenylmethane diisocyanate were added to the components whereby the reaction was conducted at 40° – 45°C for 2 hours. 2.0 Parts of N-methyldiethanolamine were added to the mixture at 50 – 55°C whereby the components were reacted at 20° – 30°C for 24 hours and a colored rubber-like polyurethane product was obtained. 88.8 Parts of a 24 percent solution of the colored polyurethane product in acetone was added to 200 parts by volume of an aqueous 1N-acetic acid solution whereby the pH was adjusted to 5. The acetone was recovered under reduced pressure and an aqueous brown polyurethane dispersion containing 32.5 percent of a solid component was obtained.

When a polyether polyol or a polyester polyol with a molecular weight of 500 – 4,000 was used instead of polypropyleneglycol, a similarly colored polyurethane dispersion was obtained. Further, when 1.5-naphthylenediisocyanate, 1,3-phenylenedisocyanate, 2,4-tolylene diisocyanate or urethane triisocyanate prepared by reacting 3 moles of 2,4-tolylene diisocyanate with one mole of trimethylol propane was used instead of 4,4'-diphenylmethane diisocyanate, and N,N-dimethylethanolamine, N-methyl-N-(3-aminopropyl)-ethanolamine, N,N-dimethylethylenediamine or bis-(3-aminopropyl)-methylamine was used instead of N-methyldiethanolamine, a similarly colored polyurethane dispersion was also obtained.

EXAMPLE 4

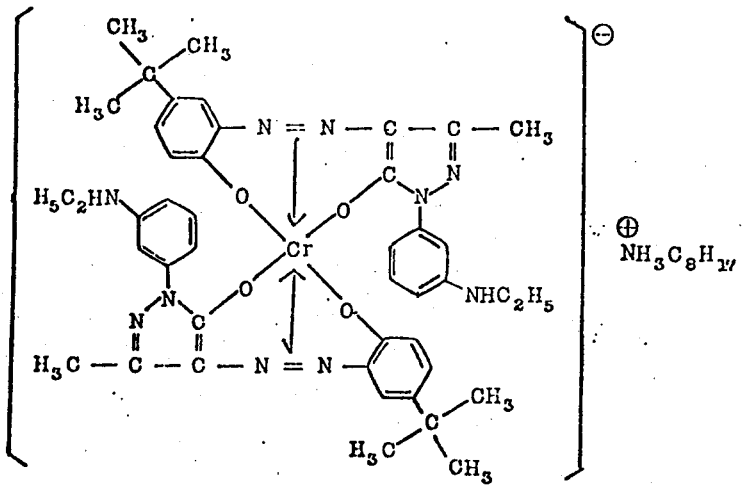

0.5 Part of the 2 : 1 complex chromium dye with the formula above which has ethylamino groups was dissolved in a mixture of 40 parts of tetrahydrofuran and 20 parts of dimethylformamide. 13 Parts of polytetramethyleneglycol (OH value 118) was added to the mixture, and 3.6 parts of 2,4-tolylenediisocyanate was added at 50° – 55°C with vigorous stirring whereby a yellowish-orange colored polyurethane solution was obtained. The solution was slowly added to a vigorously stirred solution of 2 parts of polyoxyethylene laurylether in 100 parts of water, and then the mixture was stirred for an additional hour whereby an aqueous yellowish-orange colored polyurethane dispersion was obtained.

When polypropyleneglycol (OH value 105) was used instead of polytetramethylene glycol, a similarly colored polyurethane dispersion was obtained. Further, when urethane triisocyanate prepared by reacting 3 moles of 4,4'-diphenylmethane diisocyanate with one mole of trimethylol propane was used instead of 2,4-tolylenediisocyanate, and a higher alcohol sulfate, alkyloxymethylpyridinum chloride or other surfactant was used instead of polyoxyethylene laurylether, a similarly colored polyurethane dispersion was obtained.

EXAMPLE 5

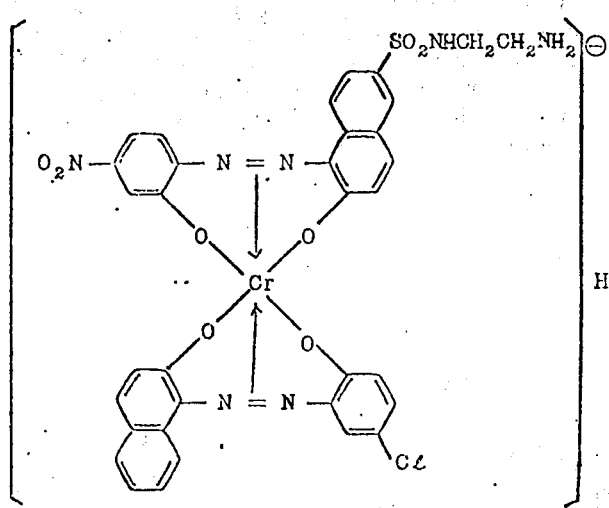

1.5 Parts of an asymmetrical 2 : 1 complex chromium dye of the formula above was admixed with 100 parts of stirred polytetramethyleneglycol (OH value 106) at 70° – 80°C for 1 hour. 50.0 Parts of 4,4'-diphenylmethane diisocyanate was added to the solution whereby the mixture was reacted for 10 minutes. 22.2 Parts of dihydroxyethyladipate was added to the stirred mixture for 15 minutes. The violet colored viscous material obtained was poured into a cup which was coated with a cured silicon material, and was kept in the cup for about 3 hours in a heater at 130°C. A violet colored polyurethane elastomer which had no plasticity was obtained.

When the elastomer was cut into segments and weighed in a mold coated with a cured silicon material and the elastomer was compressed at 160°C under 100 Kg/cm² for 15 minutes, the desired violet colored polyurethane product was obtained. Further when polytetramethylene adipate (OH value 156), polypropylene adipate (OH value 100) or polyethylene adipate (OH value 152) was used instead of polytetramethyleneglycol, a similarly colored polyurethane elastomer was obtained. When 4,4'-diphenyldiisocyanate, 1,5-naphthylenediisocyanate, hexamethylenediisocyanate or an isocyanate containing a prepolymer prepared by reacting 2,4-tolylenediisocyanate with the polyester polyol of adipic acid and propyleneglycol, was used instead of 4,4'-diphenylmethane diisocyanate, and when dihydroxyethyl succinate, dihydroxybutyl adipate, or dihydroxyethyl isophthalate was used instead of dihydroxyethyl adipate, a similarly colored polyurethane elastomer was obtained.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a colored polyurethane material, which comprises:

reacting a polyisocyanate compound and a polyhydroxyl compound with a copper phthalocyanine dye of the formula $$CuPc \begin{array}{c} (SO_2NRR_3)_x \\ (SO_3^-\overset{+}{N}H_2R_4R_5)_y \end{array} \quad\quad (9)$$

wherein R represents hydrogen, alkyl or hydroxyalkyl; $R_3$ represents —E—$X_4$ wherein E represents a substituted alkylene group containing at least one $X_4$ group wherein $X_4$ represents hydroxyl, amino, alkylamino or an alkylamino group substituted with a non-dissociable group; $R_4$ represents hydrogen or alkyl; $R_5$ represents alkyl or an alkyl group substituted with a non-dissociable group; $x$ represents an integer from 1 to 4, $y$ represents an integer from 1 to 3 and $x + y$ is 2, 3 or 4, which phthalocyanine dye contains at least one amino group or a hydroxyl group having one active hydrogen atom.

2. The process of claim 1, wherein said phthalocyanine dye, said polyisocyanate and said polyhydroxyl compound are polymerized in an inert solvent which is inert to the isocyanate groups present in solution.

3. The process of claim 1, wherein said phthalocyanine is initially reacted with an excess amount of said polyisocyanate and then said polyhydroxyl compound is added to said reacted polyisocyanate.

4. The process of claim 1, wherein said phthalocyanine dye, said polyisocyanate and said polyhydroxyl compound are polymerized to form a prepolymer and then said prepolymer is reacted with a compound which contains an active hydrogen atom and a salt forming group.

5. The process of claim 1, wherein said polyisocyanate is a prepolymer which contains unreacted isocyanate groups.

6. The process of claim 1, wherein said polyhydroxyl compound is a polyol or a polyurethane containing unreacted hydroxyl groups.

* * * * *